May 31, 1927.  
E. L. MARTIN  
AUTOMOBILE SUSPENSION  
Filed July 31, 1925    2 Sheets-Sheet 1
1,631,103
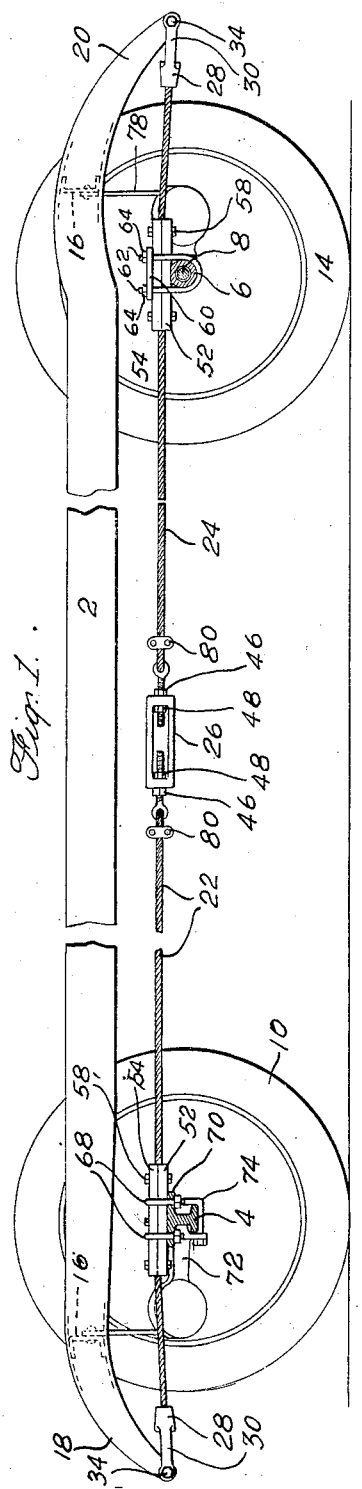
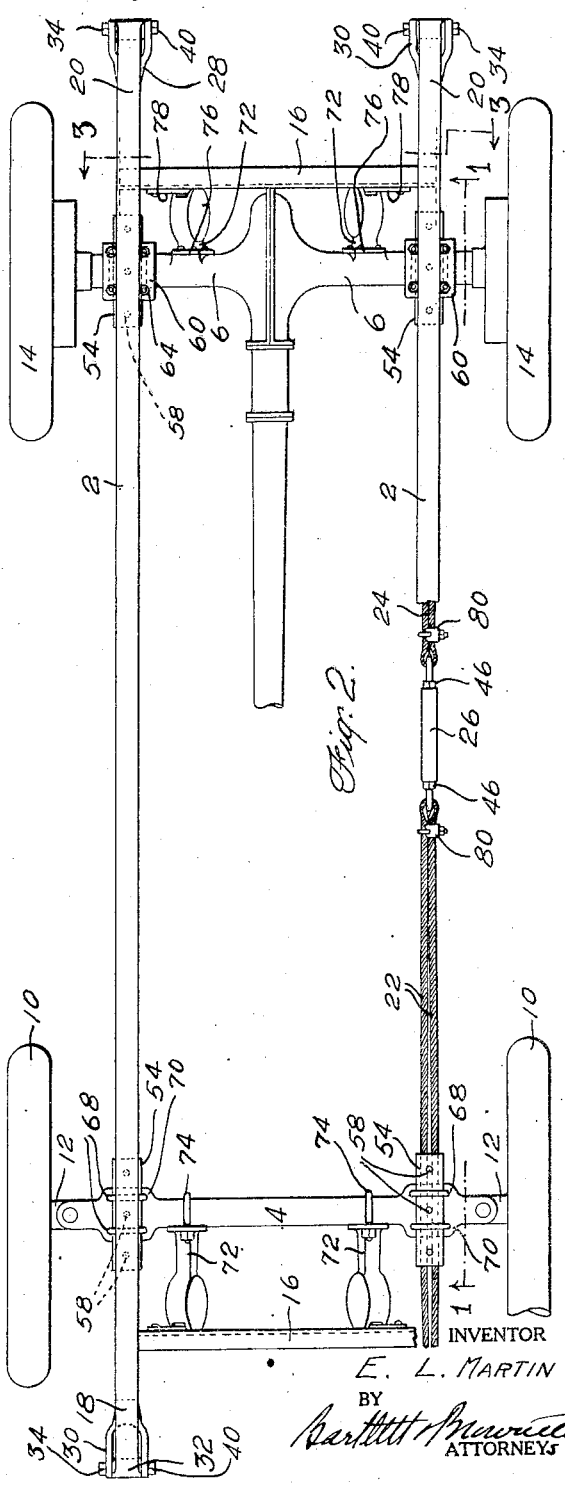
INVENTOR  
E. L. MARTIN  
BY  
Bartlett Maxwell  
ATTORNEYS May 31, 1927.  
E. L. MARTIN  
1,631,103  
AUTOMOBILE SUSPENSION  
Filed July 31, 1925 2 Sheets-Sheet 2
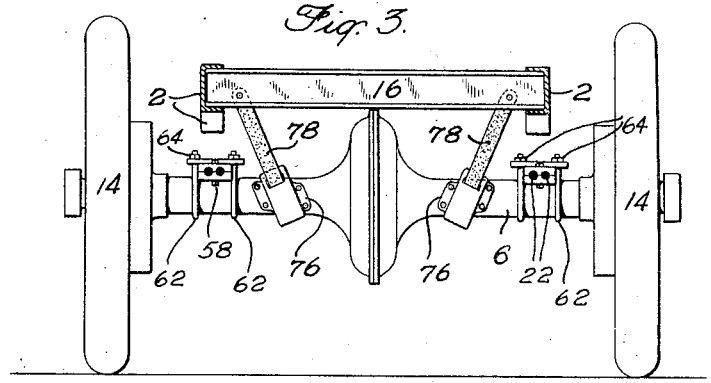
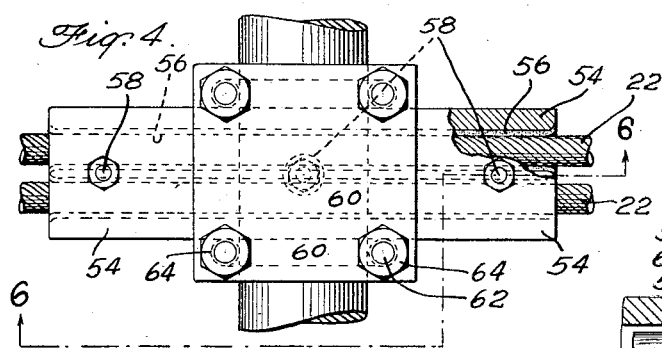
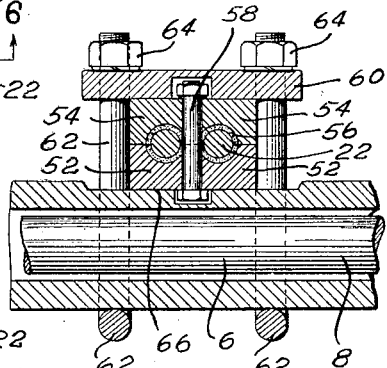
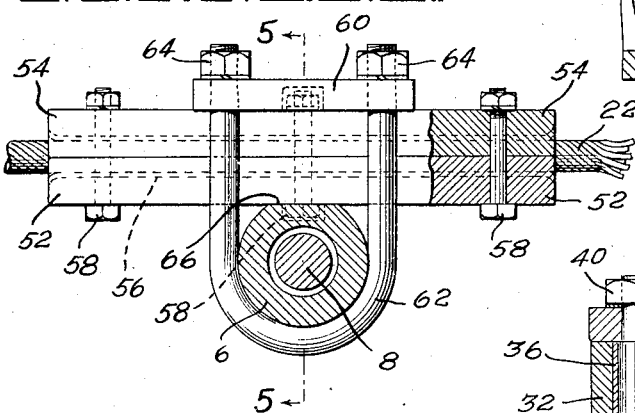
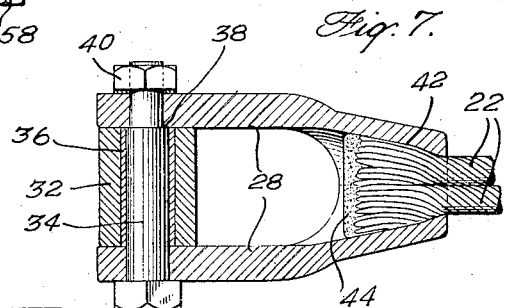
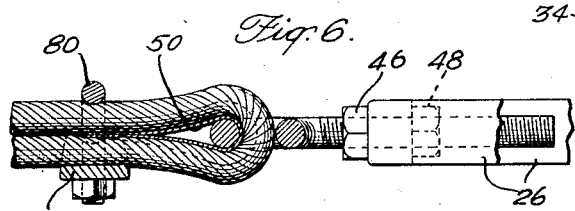
INVENTOR  
E. L. MARTIN.  
BY  
ATTORNEYS Patented May 31, 1927.

1,631,103

UNITED STATES PATENT OFFICE.

EARL L. MARTIN, OF MIAMI, FLORIDA, ASSIGNOR TO C. L. BROWN, OF MIAMI, FLORIDA.

AUTOMOBILE SUSPENSION.

Application filed July 31, 1925. Serial No. 47,264.

My invention relates to an automobile suspension and has for its object to provide a new and improved means for suspending the frame of an automobile. It further has for its object to provide a suspension which shall be more durable than suspensions now in use and which shall eliminate the intense shock of springs at present in use. It further has for its object to greatly reduce the cost of suspension and to provide means for adjusting the same to meet varying conditions.

The following is a description of an embodiment of my invention, reference being had to the accompanying drawings, in which, Fig. 1 shows a side elevation of the frame of a chassis, together with two side wheels and suspension connecting the two, the same being on the line 1—1, Fig. 2;

Fig. 2 is a plan view of the same, parts being shown broken away;

Fig. 3 is a rear view of the same with the frame in section on the line 3—3, Fig. 2;

Fig. 4 is a plan view of a detail showing the suspension clamp over the rear axle;

Fig. 5 is a longitudinal section of the same on the line 5—5, Fig. 6;

Fig. 6 is a sectional view on the line 6—6, Fig. 4;

Fig. 7 shows a sectional view of an end socket secured to a cable section; and

Fig. 8 shows a sectional view of a turn buckle connected to a loop in the suspension cable.

Referring more particularly to the drawings, 2 is a side member of the frame supported upon a forward axle 4 and a rear housing 6 surrounding an axial section 8. 10 are wheels carried by knuckles 12 carried by the front axle and 14 are wheels carried by the rear axle sections. The two frame members are connected together in the ordinary way by cross-bars 16. The forward end portions 18 and the rear end portions 20 of the side bars extend downwardly, the same being rigid and preferably integral with the body portions of the side bars. Connected to the lower ends of these downwardly projecting portions is a cable formed of two looped sections 22 and 24 and a turn buckle 26, whereby the two sections can be drawn as taut as desired. Each section is provided with a thimble 28 having arms 30 which embrace the ends or goose necks 32 of the side frames, being secured thereby by a bolt 34 surrounded by a bronze bushing 36 and having a shoulder 38 so as to prevent the nut 40 from drawing the arms 30 together sufficiently to bind upon the sides of the goose neck 32. One arm 30, being clamped between the shoulder 38 and the nut 40, holds the thimble fixed relatively to the bolt 34 so that any movement which takes place is between the bolt 34 and the bronze bushing 36, the surfaces of which can be lubricated in any desired manner.

The thimble 28 is provided with a conical recess 42 into which the ends of the cable loop are introduced. After the ends are so introduced the strands are spread out and secured therein by babbitt 44 in the ordinary way. The turn buckle is provided with lock nuts 46 and 48 which hold the same in fixed position after adjustment. The looped end of the cable is provided with a metal cable eye 50 which prevents wear directly upon the cable.

The cable is secured to the front axle and to the rear axle housing by two clamps composed of a lower plate 52 and an upper plate 54 having parallel grooves lined with babbitt 56. For the purpose of assembly these plates, after being placed upon the cables, are clamped together by bolts 58. A clamping plate 60 is placed upon the top of the plate 54 and the whole is clamped together by U-bolts 62 secured by the nuts 64. The rear clamp rests upon a flattened surface 66 of the rear housing, a recess being formed for the head of the central bolt 58. The lower plate of the forward clamp rests upon the flat surface of the forward axle, being secured thereto by depending U-bolts 68 passing through ears 70 formed upon the front axle.

In order to reduce shocks due to inequalities in the road and prevent sidewise swaying of the car body, I provide shock absorbers, preferably of the well known Gabriel snubber type. These snubbers have arms 72 connected to the front axle and rear axle housing respectively. The connections with the front axle are preferably U-bolts 74. The rear snubbers are directly bolted to the rear housings as shown at 76. The casings of these snubbers are inclined as shown in Figs. 2 and 3 so that their straps 78 are inclined and extend upwardly and outwardly, the same being connected to the cross-bars 16. The snubbers in these inclined positions act to prevent not only the upward throw of the frame but also to prevent any sideway swaying thereof.

I preferably clamp the cable loops between the turn buckles by clamps 80.

In operation, the frame with the parts supported thereby, hangs easily upon the axles, being suspended by the cables and there being an absence of spring action, and the objectionable rebound of the springs on automobiles as made at present is eliminated. If, however, either wheel hits an obstruction, the portion of the cable adjacent thereto moves upwardly, which tends to throw the cable adjacent to the other wheel downwardly, resulting in a yielding action and equalizing the entire weight, there necessarily being some slack in the cable. This action is due to the fact that each cable is connected to both the front axle and the rear axle housing, which is an important feature in my invention. The cable, when adjusted, however, is so taut as to be approximately straight. It is satisfactory if the adjustment is such that from the clamp to the adjacent end of the frame there is an approximate two inch drop, the clamps being about two feet from the ends of the cables. The clamps secure the front axle and rear housing to the cables at fixed points and the portion of the cable between said points is maintained normally taut and straight by the weight of the supporting parts.

The suspension is not only one which rides easily but is very durable, is cheap to manufacture, and it eliminates practically all points of lubrication under a car.

It is particularly adapted for automobile trucks in which as at present constructed there is practically no resiliency if the load is substantially less than full capacity load, such for instance as a one ton load on a truck of six ton capacity.

As will be evident to those skilled in the art, my invention permits of various modifications without departing from the spirit thereof or the scope of the appended claims.

What I claim is:

1. In an automobile suspension the combination of a frame having two side bars with downwardly turned end portions, cables fixedly connected to the ends of each of said side bars, and a front axle and a rear axle housing connected by clamps to each of said cables at fixed points removed from the ends thereof, the parts of said cables between said points being straight.

2. In an automobile suspension the combination of a frame having two side bars with downwardly turned end portions, cables connecting the ends of each of said side bars, and a front axle and a rear axle housing connected by clamps to each of said cables at fixed points removed from the ends thereof, said cables comprising stranded sections and tension adjusting means, the portions of said cables between said points being straight.

3. In an automobile suspension the combination of a frame having two side bars with downwardly turned end portions, cables connecting the ends of each of said side bars, a front axle and a rear axle housing connected fixedly to each of said cables at points removed from the ends thereof, each of said cables comprising looped stranded sections, and turn buckles connecting the looped ends of said sections.

4. In an automobile suspension the combination of a frame having two side bars with downwardly turned end portions, cables connecting the ends of each of said side bars, babbitt lined clamps upon said cables removed from the ends thereof, and a front axle and a rear axle housing connected to said clamps.

5. In an automobile suspension the combination of a frame having two side bars with downwardly turned end portions, cables fixedly connected to the ends of each of said side bars, a front axle and a rear axle housing connected to each of said cables at fixed points removed from the ends thereof, and snubbers connected to said frame and said axle and housing and inclined at an angle from a longitudinal vertical plane.

6. In an automobile suspension the combination of a frame having two side bars with downwardly turned end portions, cables connecting the ends of each of said side bars, a front axle and a rear axle housing connected to each of said cables at points removed from the ends thereof, and snubbers connected to said frame and said axle and housing, said snubbers being inclined so as to retard both vertical movement and lateral swinging of said frame.

In testimony whereof, I have signed my name to this specification this 30th day of July, 1925.

EARL L. MARTIN.